Sept. 15, 1959        H. GELLING        2,904,248

DIFFERENTIAL MECHANISM FOR TEN-KEY MACHINES

Filed Dec. 27, 1955        2 Sheets-Sheet 1

Inventor

Helmuth Gelling

Sept. 15, 1959  H. GELLING  2,904,248
DIFFERENTIAL MECHANISM FOR TEN-KEY MACHINES
Filed Dec. 27, 1955  2 Sheets-Sheet 2

Inventor

United States Patent Office 2,904,248
Patented Sept. 15, 1959

2,904,248

DIFFERENTIAL MECHANISM FOR TEN-KEY MACHINES

Helmut Gelling, Ulm, Germany, assignor to Walther Büromaschinen Gesellschaft m.b.H., Gerstetten, Wurttemberg, Germany, a firm Application December 27, 1955, Serial No. 555,736

Claims priority, application Germany January 7, 1955

8 Claims. (Cl. 235—60)

The invention relates to a differential mechanism for ten-key machines, particularly ten-key machines with a pick up bar, which releases the differential members actuated by springs for the setting movement, or returns them into their home position.

Upon use of spring actuated differential mechanisms of such kind the setting members in form of keys, set pins or the like, have to remain in their adjusted position till the pick up bar is returned again into its home position.

Besides this, rebounding of the differential members is possible when they strike against the adjusted setting means or, in the case of totalizing, when they are stopped by the zero abutments of the totalizer wheels, whereby misadjustment of the totalizer wheels, missettlements of the printing types and incorrect tens-carrying can occur.

In order to avoid these drawbacks, according to the invention, directly after a differential member has attained its adjusted position, the pick up bar acts onto an intermediate member which causes the return of the adjusted setting member into its position of rest. Further, according to the invention, the intermediate member is provided with a stop finger, which, in the adjusted position of its differential member, is pressed into a blocking plate by the pick up bar and blocks the differential member in its adjusted position.

By these measures it will be attained with simple means that the setting mechanism keeps ready for the preparation of a new adjustment already at the end of the releasing motion of the pick up bar, and that rebounding upon striking of the differential members against their abutments no longer arises. Further it will be avoided, that on totalizing, the differential members, after being disengaged from the totalizer, are able to follow freely the action of their springs, thereby striking against the pick up bar with great noise. In order to avoid this noise in known machines particular mechanisms are built in.

With the application of the invention to ten-key machines having a transversely shiftable set-pin carriage the latter can be returned into its home-position already after termination of the releasing movement of the pick up bar, whereby the calculating work may be accelerated. Other objects of the invention result from the following description of embodiments of the invention.

Figure 1:
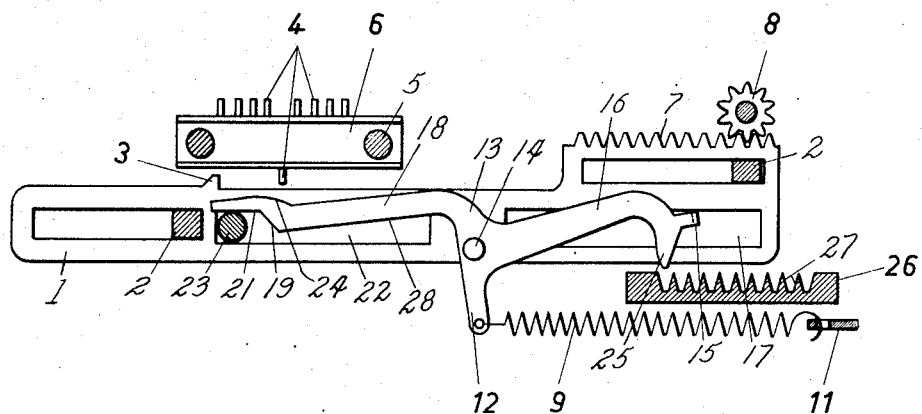
Fig. 1 is a side elevation of an embodiment of a denomination of the differential mechanism in the home position.
Figure 2:
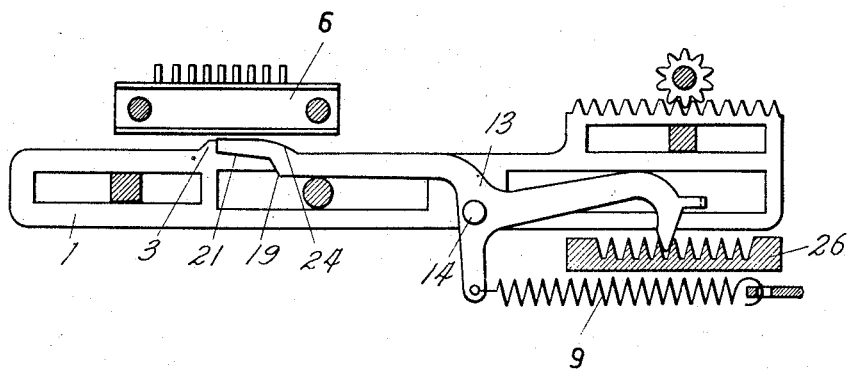
Fig. 2 is a corresponding elevation in a value adjustment position.

The differential members (Fig. 1) are shiftable longitudinally on transversely directed four-edged bars 2 spaced apart from each other by combs not shown. They cooperate by noses 3 with adjusted set pins 4 of a set pin carriage 6 transversely shiftable on bars 5. Instead of set pins 4 other set means such as set levers, key shanks or the like may also be used. Gears 7 of the differential members 1 cooperate with intermediate wheels 8 leading to the wheels of the totalizer, or with the totalizer wheels themselves in a known manner. Each differential member 1 is actuated by a spring 9, which is connected at its right end to a bar 11 and at its other end to an arm 12 of a three-armed lever 13 pivotally mounted on its differential member 1 by means of a pin 14. By the action of the spring 9 it bears usually against the upper wall of a recess 17 of the differential member by means of a bent 15 of its right hand arm 16. The other arm 18 directed towards the left cooperates with the pick up bar 23 directed through the openings 22 of all differential members by means of a bevel face 19 and a horizontally directed face 21.

When the machine is at rest, the pick up bar 23 maintains all differential members 1 in their left end position against the action of the springs 9.

At the beginning of the revolution of the machine the pick up bar moves to the right releasing the differential members 1 till their noses 3 strike against the adjusted setting members 4, or, in the case of totalizing, till the differential members are blocked against further movements when the zero teeth of the totalizer wheels strike against zero abutments.

After the releasing movement each differential member 1, in the first instance, follows the pick up bar 23 under the action of the spring 9 till it is stopped by striking of its nose 3 against the adjusted set pin 4. After that, on further movement the pick up bar 23, presses against the bevel face 19 of the lever arm 18, thereby rocking the three-armed lever 13 in clockwise direction. The back face 24 of the lever arm 18 located above the bevel face 19 thereby strikes from below against the adjusted set pin 4 pressing it upwards back into its position of rest.

At the end of the movement of the pick up bar comprising nine or, in the event the differential members serve as transfer performing means, ten units all adjusted set pins being returned into their position of rest so that simultaneously therewith the set pin carriage 6 can be returned laterally into its position of rest in order to be adjusted anew and, which is more, the new setting can be performed directly after the pick up bar has reached its home position so that the new setting will not be delayed by the returning of the set pin carriage.

In order to retain the differential members in their adjusted position after the return of the adjusted set pins into their position of rest and at the same time to prevent rebounding of the differential members when their noses 3 strike against the setting members, the right hand arm 16 of the lever 13 is provided with a blocking finger 25, which cooperates with a blocking plate 26 having blocking notches 27 corresponding to the ten values 0 to 9 and being coordinated to all differential members 1 lying side by side. Upon stopping of the differential movement and the rising of the arms 18 of the levers 13 their blocking fingers 25 engage the corresponding notches 27 and maintain blocking of the differential members in the corresponding adjustment positions so that the set pins 4 no longer are necessary and therefore may be returned into their position of rest. The engagement of the blocking finger 25 into the corresponding blocking notches 27 also brings about a precise adjustment of the differential members and prevents rebounding of them.

As soon as the pick up bar 23 during its further movement leaves the bevel face 19, it glides along the lower plain face 28 of the lever arm 18 which is positioned horizontally in the upwards swung position of the lever arm 18 so that during the further to and fro motion of the pick up bar the blocking fingers 25 are maintained in engagement with their blocking notches 27.

Upon the return movement of the pick up bar the three-armed levers 13 are rocked in counter clockwise direction by the springs as soon as the pick up bar 23 arrives below the bevel face 19 whereby the blocking fingers 25 are disengaged out of the blocking plate 26.

Figure 3:
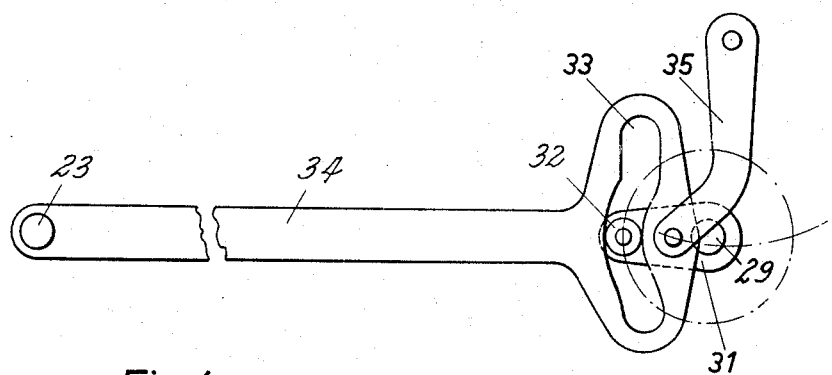
Fig. 3 is a side elevation of the driving mechanism for the pick up bar.

The to and fro movement of the pick up bar 23 is effected by two crank levers 31 fixed to a driving shaft 29 (Fig. 3) mounted in the frame of the machine which engages transverse slots 33 of connecting rods 34 by means of antifriction rollers 32. The connecting rods 34 are connected at its left hand ends to the ends of the pick up bar 23 and are guided by links 35. The slots 33 are provided in their centre with a part formed along an arc of a circle, the radius of which corresponding with the crank radius of the antifriction roller 32 so that the pick up bar stands still in its left end position represented in Fig. 3 during a part of the revolution of the driving shaft 29. During this space of time necessary other movements of the driving mechanism can be performed.

Figure 4:
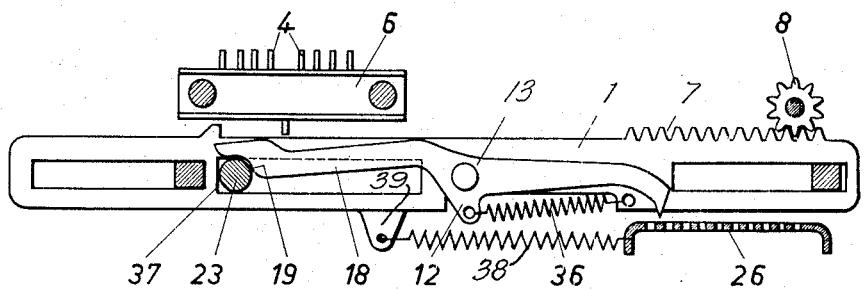
Figs. 4 and 5 are elevations corresponding to Figs. 1 and 2 of a modified embodiment.
Figure 5:
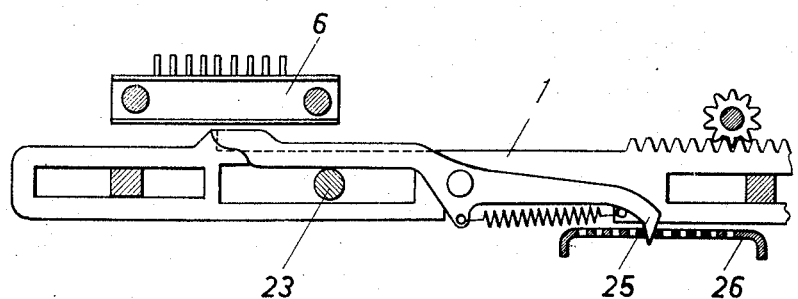

In the embodiment corresponding with Figs. 4 and 5, between the three-armed lever 13 and its differential member 1 a particular spring 36 is provided while other springs 38 (Fig. 4) annex to projections 39 of the differential members and to the blocking plate 26, act directly onto each differential member in order to draw it into its home position.

When the bevel face 19 of the lever arms 18 are arranged, thus that the pick up bar 23 in its position of rest fits between the bevel face 19 and the left end wall 37 of the slots without lost motion, particular returning springs for the differential member can be dispensed with if there is taken care of that the resistance to be overcome by the pick up bar 23, occurring upon the rocking of the lever 13, is always greater than the resistance caused by the movement of the differential members with their allotting parts. This embodiment of the invention shows the blocking plate 26 in the form of a stamped perforated plate.

What I claim is:

1. In a differential mechanism for calculating machines with spring actuated differential members, setting members controlling the adjustments of the differential members adapted to assume a position of rest in which the differential members remain uninfluenced and an adjusted position in which they stop their differential members in their adjustment positions, a pick up bar adapted to maintain the differential members in their position of rest, to release them at the beginning of the machine operation for the adjustment movement, and to return them into their position of rest, an intermediate member pivotally mounted on each differential member adapted to be rocked by said pick up bar and adapted thereby to restore the setting member of said differential member from the adjusted position to the position of rest, the cooperating faces of the differential members and the setting members, cooperating with each other, on the one hand, and the faces of the pick up bar and the intermediate member, cooperating with each other, on the other hand, being arranged thus that said intermediate member is moved directly after a released differential member has attained its adjustment position, whereby shortly after the adjustment of a differential member the allotted adjusted setting member will be returned into its position of rest.

2. In a differential mechanism according to claim 1, said intermediate member having the form of a lever pivotally mounted on its differential member, a bevel face on said intermediate member situated in the path of movement of the pick up bar the face of the lever cooperating with the setting member being situated above said bevel face whereby upon striking of the pick up bar against said bevel face the intermediate lever will be moved from below towards the adjusted setting member pressing same into its position of rest.

3. In a differential mechanism according to claim 1, said intermediate member having a blocking finger, a stationary blocking plate having blocking notches cooperating with said blocking finger and spaced apart from each other according to the differential positions of the differential members and located in the direction of the adjustment movement of said differential member, whereby on actuating the intermediate member by said pick up bar the blocking finger engages the allotted notch of the block plate in order to block the differential member in its adjustment position.

4. In a differential mechanism according to claim 1, a blocking plate having blocking notches spaced apart from each other according to the differential positions of the differential members and located in the direction of the movement of the differential members, a spring actuating said intermediate member, said intermediate member having the form of a three-armed lever pivotally mounted on its differential member, one arm of said intermediate member cooperating with said pick up bar and its setting member, the second oppositely directed arm having a blocking finger cooperating with said blocking plate, and the third arm being actuated by said spring.

5. In a differential mechanism according to claim 1, a spring fixed at its one end to the machine frame, at its other end to said intermediate member and tending to maintain the intermediate member in the path of movement of the pick up bar and being directed parallel with said differential members, said spring actuating, at the same time, both its intermediate member and its differential member.

6. In a differential mechanism according to claim 1, said intermediate member having the form of a lever pivotally mounted on its differential member, a bevel face on the intermediate member situated in the path of movement of the pick up bar, a stationary blocking plate having blocking notches spaced apart from each other according to the differential positions of the differential members and located in the direction of travel thereof, a blocking finger on the intermediate member cooperating with said blocking plate, a blocking face on said intermediate member following said bevel face and cooperating with said pick up bar, whereby the pick up bar upon striking against said bevel face moves said blocking finger into said blocking plate and keeps blocked the differential member by gliding below said blocking face until it leaves said blocking face during its return movement.

7. In a differential mechanism according to claim 1, wherein said setting members comprise a transversely out and home shiftable set-pin carriage of a ten-key machine, having set-pins controlling said differential members, whereby at the end of the releasing movement of the pick up bar, all previously adjusted set pins being released, the set-pin carriage is ready for its transverse home shifting.

8. In a differential mechanism according to claim 1, said intermediate member having a bevel face, a spring acting between said intermediate member and its differential member adapted to hold the said bevel face, in the path of movement of the pick up bar, a taking-with face on the differential member cooperating with the pick up bar on return movement of same and in the position of rest of the pick up bar, said taking-with face being located oppositely said bevel face with respect of the direction of movement of said differential members, said taking-with face being, spaced apart from said level face by a distance corresponding to the thickness of the pick up bar without lost motion, whereby the actuating springs for the differential members can be dispensed with.

References Cited in the file of this patent

UNITED STATES PATENTS 1,655,570    Shipley _____ Jan. 10, 1928

FOREIGN PATENTS 866,868    France _____ June 9, 1941
747,755    Germany _____ Oct. 13, 1944
686,541    Great Britain _____ Jan. 28, 1953